Patented Dec. 19, 1939

2,183,570

UNITED STATES PATENT OFFICE 2,183,570

PROCESS FOR THE PRODUCTION OF YEAST

Robert Roy Irvin and Morris W. Mead, Jr., Bloomfield, N. J.

No Drawing. Application July 28, 1937, Serial No. 156,232

13 Claims. (Cl. 195—93)

The present invention relates to a process for the production of yeast.

Certain commercial processes for producing yeast are well known which are commonly used in the industry. The object of the present invention is to provide an improved process giving greater production, and a better grade of yeast at lower expense.

More particularly, the invention contemplates a process in which the production of yeast per fermenter is increased from ten to thirty percent over the present commercial processes without any increase in the fermenting equipment required for carrying it out.

Another important advantage of the process is that it does not require the large amounts of seed yeast heretofore used, and in fact the quantity of seed yeast used may be reduced to about one-half of the usual commercial quantities.

A further object of the process is to produce a yeast of improved quality, as the result of the propagation of a well nourished and actively growing yeast during the later stages of the process.

A further object is to obtain a good yield of yeast based on the raw materials used, while reducing the amount of air blown through the propagating wort.

The process when carried into effect consists in certain modifications of nutrient concentration, dilution, quantities of seed yeast, aeration, and time of the process. By this process it has been possible to increase the yeast production of present fermenters by from twenty-five to thirty percent while utilizing only one-half or less of the quantity of seed yeast heretofore required for the usual procedure with its smaller production.

The process broadly is characterized by the fact that the fermentation is divided into two distinct phases. During the first of these phases the yeast is grown under conditions considerably different from those ordinarily used in commercial yeast manufacture. In the process during this first phase or stage the concentration of the setting wort and the proportion of nutrients to yeast in the propagating mass is maintained relatively high. Aeration is carried out at a slower rate, or is less intense. The amount of seed yeast used for setting is low. The second phase is carried out under conditions substantially the same as those customary in commercial yeast manufacture. Between the two stages the fermenter is diluted with water, and during the second stage the volume of air or rate of aeration is increased.

One advantage of the process is that it is carried out as a batch process involving a continuous procedure requiring only one fermenter, and is interrupted only between the two stages to permit the dilution there desired.

The purpose of the first stage of the process is to produce a considerable quantity of a very strong, actively growing yeast which will be available to produce commercial yeast of high quality during the second stage. Applicants believe that the improved quality of the yeast obtained is the result of the production of this strong and well nourished yeast during the first stage. This is true even though the original seed yeast employed undergoes many more successive reproductions during the entire process than in commercial procedures where higher seeding is used. Such a result is contrary to the general expectations of those engaged in yeast making, and is contrary to the modern trend of practice, which has attempted to increase yields and quality by higher initial seeding. The use of this high seeding is illustrated, for example, in United States Patent No. 2,029,572. By the present process similar results are obtained with the employment of much less seed yeast, which is one of the more expensive items in the manufacture of yeast, and the utilization of a larger quantity of the cheaper nutrients such as molasses.

In carrying out the process it is advantageous to carry it on for a somewhat longer time than in ordinary commercial yeast making. For example, the process may run about two hours more than usual. During this increased time, however, the amount of nutrient fed in is increased and the amount of yeast produced is likewise increased.

The following examples show the carrying out of the process of the invention, as compared with control processes following the old procedure.

Example 1

A total of 4725 grams of molasses was utilized in a process in which the fermentation lasted for fourteen hours. A fermenter was set with 315 grams of molasses, the extract of 437 grams of grain, 75 grams of di-ammonium phosphate and 50 grams of ammonium sulphate. 302 grams of seed yeast of 70% moisture content were added, and the fermenter was diluted to bring its volume up to 57.6 liters. The mixture had a Balling value of 1.25°. Aeration was commenced, and molasses was fed continuously to the fermenter. 199 grams of aqua ammonia containing 29% of $NH_3$ was used to supply additional ammonia during the process. During the first six hours, about 2600 cu. ft. of air were blown through the fermenter. 1470 grams of molasses were gradually added during the six hour period. During the first six hours, the volume of air was increased somewhat as the process continued, but at no time did it exceed 8 to 9 cu. ft. per minute.

At the end of six hours, the material had a Balling value of 2.1°. The fermenter was then diluted with water to a volume of 95 liters when it had a Balling value of 1.55°. Thereafter aeration was continued for eight hours while the remaining 2940 grams of molasses were gradually fed in, while blowing through about 4790 cu. ft. of air. At the end of this second period of 8 hours, the material had a Balling value of 2.6°.

The results of this procedure may be expressed as follows: The gross yield of yeast was 4186 grams, of 70% moisture content, which was adopted as the standard moisture content for all the tests herein described. The net yield was 3884 grams. The net yield on the material, subtracting the seed yeast, was 70.8%.

A control process was carried out at the same time and in the usual manner under similar conditions. 3600 grams of molasses were used. The fermenter was set with 500 grams of molasses, the extract of 416 grams of grain, 75 grams of di-ammonium phosphate, and 50 grams of ammonium sulphate. The fermenter was set with 754 grams of seed yeast and filled with water to 95 liters, so that it had a Balling value of 1.1°. 202 grams of aqua ammonia containing 29% NH₃ were used during the process. During the process, about 5550 cu. ft. of air were blown in over a ten hour period, and the remainder of the molasses was also gradually added. At the end of ten hours the batch had a Balling value of 2.25°. The net yield on the materials was 69.7%, the gross yield was 3782 grams of yeast and the net yield was 3027 grams.

At the end of the process, the yeast was matured for one hour with reduced aeration.

In the control test, 12.4 liters of 19° Balling molasses was diluted to 18 liters for the feeding. The gravity of this molasses was around 13.3 to 13.5°. In the new process, 17.6 liters of molasses of 19° Balling was diluted to 18 liters having a concentration of 18.7°.

From the above it will be apparent that the increased production according to the new process was 857 grams, or 28.3%.

*Example 2*

In a further comparative process, the fermenter was set with 300 grams of molasses, the extract of 433 grams of grain, 75 grams of di-ammonium phosphate and 50 grams of ammonium sulphate. There were added 269 grams of seed yeast. The material in the fermenter was diluted to 1.6° Balling, and during the first six hours about 2600 cu. ft. of air were introduced while adding gradually 1400 grams of molasses. 214 grams of aqua ammonia were used during the run. At the end of six hours the dilution was 2.2° Balling, and water was added until the value was 1.6°. During the second eight hours of the process, about 4790 cu. ft. of air were added, together with 2800 grams of molasses. At the end of the process the Balling was 2.7°. The total yield was 4017 grams of yeast and the net yield was 3748 grams. The net yield on the materials was 70.93%.

In a control process carried out at the same time and under similar conditions, for ten hours, the fermenter was set with 500 grams of molasses, the extract of 433 grams of grain, 75 grams of di-ammonium phosphate, and 50 grams of ammonium sulphate. 672 grams of seed yeast were added to the fermenter. This was diluted to a Balling of 1.35°, and during ten hours about 5550 cu. ft. of air and 3100 grams of molasses were added. 202 grams of aqua ammonia were added during the process. At the end of ten hours the Balling was 2.2°. The process produced 3860 grams of yeast, making a net yield of 3188 grams. This represented a net yield on the materials of 73.09%.

In this second test the control feed was the same as in the first test, but 18 liters of molasses solution were utilized having a concentration of 17.8° Balling.

It will be evident that the increase in yield in the new process over the control was 17.5%.

While we have given above examples of the new process, it will be obvious that variations may be made therein within reasonable limits while still obtaining advantageous results. For example, the time of the process may vary in most instances from 12 to 15 hours, and the relative duration of the first stage may be from 35% to 50% of the total process. Around 43% of the total time appears to give the most desirable results.

The amount of seed yeast in the normal commercial process is from 15 to 25% based on the amount of molasses or nutrients. According to the present process the amount of seed yeast is from 3.5 to 15%, and preferably within the range of 7 to 10%.

The amount of molasses fed during the different stages is also variable, and that fed during the first stage may amount to from 20 to 45% of the total, and preferably is between 30 and 40%.

The volume of setting wort is different from that in the ordinary process, and preferably is from 40 to 80% and usually around 60% of that customarily used.

We have carried out the above procedures at a fermentation temperature of 28° C., but obviously this temperature might be varied, particularly with variations in the time of the process.

The yeast produced according to the process has been tested in comparison with yeast made by the control process and found to be definitely superior in quality.

Use of the process in the plant shows similar savings and economies. Calculated on the basis of the additional air necessary for producing the extra seed yeast for the old method, the new process showed a reduction in the air required of about 5.6% in plant-scale operation. The other improvements were equal to, or greater than, those found in the laboratory.

Feeding of molasses was begun one hour after the setting in all cases and was continuous and at a progressive rate according to the well known principles. However, continuous feed of molasses is not a necessary requirement, as long as it is fed at sufficiently close intervals.

While we have described herein some embodiments of our invention, we wish it to be understood that we do not intend to limit ourselves thereby except within the scope of the appended claims.

What we claim is:

1. A process of making yeast by the aeration method which comprises introducing seed yeast into a nutrient wort, aerating at a relatively low rate and preserving the concentration of the nutrients relatively high for a period of time amounting to 35% to 50% of the total time of the process, and then during the remaining period of time propagating with increased aeration and a less concentrated nutrient wort.

2. A process of making yeast which comprises introducing seed yeast into a nutrient wort, aerating said wort at a relatively low rate for a period of time amounting to 35% to 50% of the total time of the process while maintaining the concentration of nutrients relatively high, then diluting the propagating mass, and continuing aeration at a higher rate while maintaining the concentration of nutrients relatively low during the remaining period of time.

3. A process of making yeast by the aeration method which comprises setting a fermenter with yeast nutrients, adding a relatively small amount of water so as to produce a relatively concentrated setting wort, seeding the wort with seed yeast, commencing propagation of yeast by aerating at a relatively low rate while adding further nutrients in a manner to maintain the nutrients in the wort relatively concentrated for a period of time amounting to 35% to 50% of the total time of the process, then adding a considerable quantity of water so as to dilute the nutrient mass, and thereafter continuing propagation by aerating more rapidly and by adding nutrients to the diluted wort over the remaining time.

4. A process as claimed in claim 3 in which seed yeast is added in an amount from 3.5% to 15% of the total amount of nutrients used during the whole process.

5. A process as claimed in claim 3 in which the amount of nutrients added during the first stage is from 20% to 45% of the total amount of nutrients used during the whole process.

6. A process as claimed in claim 3 in which the volume of wort at time of setting is from 40% to 80% of that immediately after dilution of the fermenter with water.

7. In a process of producing yeast, the steps of adding to a yeast nutrient mixture seed yeast, commencing propagation of such yeast during a first stage while aerating and preserving the concentration of nutrients relatively high, and then in a second stage further propagating with increased aeration and less concentrated nutrients, said first stage being for a period of time amounting to 35% to 50% of the total time consumed by the first and second stages together.

8. In a process of producing yeast, the steps of adding to a yeast nutrient mixture seed yeast in an amount from 3.5% to 15% of the nutrients used, commencing propagation of such yeast during a first stage while aerating, and then in a second stage further propagating with increased aeration and less concentrated nutrients, said first stage being for a period of time amounting to 35% to 50% of the total time consumed by the first and second stages together.

9. A process of making yeast which comprises setting a fermenter with yeast nutrients, adding to such fermenter seed yeast in an amount from 3.5% to 15% of the amount of nutrients used during the whole process, adding a relatively small amount of water so as to produce a relatively concentrated setting wort, commencing propagation of yeast by aerating at a relatively low rate while adding further nutrients at a relatively low rate for a period of time amounting to 35% to 50% of the total time of the process, adding a considerable quantity of water so as to dilute the nutrient mass, and thereafter continuing propagation in a relatively dilute wort while adding nutrients more rapidly and aerating more rapidly during the remaining period of time.

10. A process as claimed in claim 9 in which said nutrients comprise principally molasses.

11. A process as claimed in claim 9 in which the amount of nutrients added during the first stage is from 20% to 45% of the total nutrients.

12. A process as claimed in claim 9 in which the amount of nutrients added during the first stage is from 30% to 40% of the total nutrients.

13. A process of making yeast by the aeration method which comprises setting a fermenter with a solution of yeast nutrients, seeding the wort with seed yeast in an amount from 3.5% to 15% of the total nutrients used, commencing propagation of yeast by aerating at a comparatively low rate while adding a further quantity of nutrients in an amount such that 20% to 45% of the total nutrients are in the fermenter when 35% to 50% of the total time of the process has elapsed, then adding water to the fermenter, and thereafter continuing propagation by aerating more rapidly and by adding the remainder of the nutrients during the remaining period of time.

ROBERT ROY IRVIN.
MORRIS W. MEAD, Jr.